(12) United States Patent
Ward (10) Patent No.: US 12,515,786 B2
(45) Date of Patent: Jan. 6, 2026

(54) SIDESTICK CONTROL APPARATUS

(71) Applicant: MU-G Technologies, LLC, Titusville, FL (US)

(72) Inventor: Robert Scott Ward, Titusville, FL (US)

(73) Assignee: MU-G TECHNOLOGIES, LLC, Titusville, FL (US)

( * ) Notice: Subject to any disclaimer, the term of this patent is extended or adjusted under 35 U.S.C. 154(b) by 0 days.

(21) Appl. No.: 18/830,730

(22) Filed: Sep. 11, 2024

(65) Prior Publication Data

US 2025/0083800 A1   Mar. 13, 2025

Related U.S. Application Data

(60) Provisional application No. 63/581,773, filed on Sep. 11, 2023.

(51) Int. Cl.
   *B64C 13/04*       (2006.01)
(52) U.S. Cl.
   CPC ................... *B64C 13/042* (2018.01)
(58) Field of Classification Search
   CPC .... B64C 13/042; B64C 13/0421; B64C 39/02
   See application file for complete search history.

(56) References Cited

U.S. PATENT DOCUMENTS

| | | | |
|---|---|---|---|
| 2017/0212514 A1* | 7/2017 | Taylor | B64C 13/0421 |
| 2021/0271286 A1* | 9/2021 | Lawniczak | G05G 9/04792 |
| 2022/0212780 A1* | 7/2022 | Lawniczak | B64C 13/0421 |
| 2024/0142269 A1* | 5/2024 | Ward | G01C 23/005 |

\* cited by examiner

*Primary Examiner* — Rodney A Bonnette
(74) *Attorney, Agent, or Firm* — Kelly G. Swartz; Widerman Malek, PL (57) ABSTRACT

A system for manipulating the control stick of an aircraft including: (1) a platform having an aperture, wherein the control stick is positioned within an area defined by the aperture; (2) a first sidewall secured to and extending perpendicular to the platform; (3) a second sidewall, opposing the first sidewall, secured to and extending perpendicular to the platform; (4) a first elongate member extending between the first and second sidewall, positioned on a first side of the control stick; (5) a second elongate member extending between the first sidewall and the second sidewall, positioned on a second side of the control stick, wherein the first side of the control stick opposes the second side of the control stick; (6) a first actuator configured to move the first elongate member along a first path; and (7) a second actuator configured to move the second elongate member along a second path.

20 Claims, 7 Drawing Sheets

SIDESTICK CONTROL APPARATUS

RELATED APPLICATIONS

This application claims priority under 35 U.S.C. § 119 (e) of U.S. Provisional Patent Application Ser. No. 63/581,773 filed on Sep. 11, 2023 and titled SIDESTICK CONTROL APPARATUS. The content of this application is incorporated herein by reference.

FIELD OF THE INVENTION

The present invention relates to systems for aircraft control. More specifically, the present invention relates to a system for positioning an aircraft control stick for the purpose of causing the aircraft to execute a preprogrammed maneuver.

BACKGROUND OF THE INVENTION

In recent years that has been an increase in demand for commercial flights designed to provide passengers with the experience of feeling microgravity. To provide this experience to passengers, pilots must execute a parabolic maneuver. When performed correctly, at the top of the parabola, passengers may experience forces of gravity less than that experienced on earth. The angle of the parabola traveled by the aircraft determines the amount of gravitation force felt by passengers. These parabolic maneuvers must be performed precisely to ensure safe operation of the aircraft and also to provide the passengers with the expected experience. Pilots execute these maneuvers with no external guidance. Therefore, a need exists to provide precise control to the aircraft and assist the pilots in precisely and safely performing parabolic maneuvers.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a system for manipulating the control stick of an aircraft including a platform, a first sidewall, a second sidewall, a first elongate member, a second elongate member, a first actuator, and a second actuator.

The platform may have an aperture and the control stick may be positioned within an area defined by the aperture.

The first sidewall may be secured to and extend perpendicular to the platform.

The second sidewall, which may oppose the first sidewall, may be secured to and extend perpendicular to the platform.

The first elongate member may extend between the first sidewall and the second sidewall and may be positioned on a first side of the control stick.

The second elongate member may extend between the first sidewall and the second sidewall, may be positioned on a second side of the control stick, and the first side of the control stick may oppose the second side of the control stick.

The first actuator may be configured to move the first elongate member along a first path.

The second actuator may be configured to move the second elongate member along a second path.

The system may include a first arcuate track defining the first path traveled by the first elongate member.

The system may further include a sprocket wherein the first arcuate track may include an aperture wherein at least a portion of a perimeter of the aperture is adapted to engage the sprocket.

The system having a first arcuate track defining the first path traveled by the first elongate member may also include a third arcuate track opposing the first arcuate track. A first end of the first elongate member may be carried by the first arcuate track and a second end of the first elongate member may be carried by the third arcuate track.

The system having a first arcuate track defining the first path traveled by the first elongate member may include a second arcuate track defining the second path traveled by the second elongate member. Such a system may also include a third arcuate track opposing the first arcuate track wherein a first end of the first elongate member may be carried by the first arcuate track and a second end of the first elongate member may carried by the third arcuate track. Such a system may also include a fourth arcuate track opposing the second arcuate track wherein a first end of the second elongate member may be carried by the second arcuate track and a second end of the second elongate member may be carried by the fourth arcuate track.

The system may include a first support member having a first end secured to the first arcuate track and a second end secured to the third arcuate track.

The control stick may be positionable between the first support member and the platform.

The system may include a processor adapted to control the first actuator to position the control stick and cause the aircraft to execute a preprogrammed maneuver.

The platform of the system may be adapted to secure to a console of the aircraft.

The first elongate member may include an angled surface adapted to contact an angled surface of the control stick.

The second elongate member may include a protuberance positioned between a bottommost surface of the second arcuate track and above the platform. The protuberance may be adapted to contact a surface of the control stick.

The first sidewall, second sidewall, first elongate member, and second elongate member may be adapted to pivot relative to the platform.

BRIEF DESCRIPTION OF THE DRAWINGS

Some embodiments of the present invention are illustrated as an example and are not limited by the figures of the accompanying drawings, in which like references may indicate similar elements.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a system for manipulating the control stick 200 of an aircraft 100. The system may secure to the console of an aircraft and be controlled to exert physical pressure on an aircraft control stick 200 to position the control stick 200 in a desired location. The system 100 may be positioned to move the control stick 200 both forward and aft, causing the aircraft to climb or descend in accordance with the positions of the control stick 200. In one embodiment, the system 100 may be controlled to position the control stick 200 in a way that causes the aircraft to execute one or more parabolic maneuvers simulating the effects of altered gravitational forces felt by occupants of the aircraft.

The system 100 may include a platform 110 positioned about the control stick 200 and secured to a console of the aircraft. The platform 110 may be a substantially planar member with a bottom surface and a top surface. The bottom surface may be affixed proximate the surface of a console in the aircraft and the top surface may oppose the bottom surface. An aperture 111 may be formed through an entirety of a thickness of the platform 110 from the bottom surface to the top surface. The control stick 200 may extend through the aperture 111.

Sidewalls 120, 130 may secure to and extend perpendicular to the platform 110 in a direction opposing the console. A first sidewall 120 may be positioned on a first side of the platform 110 and a second sidewall 130 may be positioned on an opposing side of the platform 110.

A plurality of support members 140, 141, 142 may extend between the first sidewall 120 and the second sidewall 130. In one embodiment, the plurality of support members 140, 141, 142 may be positioned at an end of the sidewalls 120, 130 opposing the ends secured to the platform 110. A first support member 141 may be positioned on a first side of the control stick 200 and a second support member 142 may be positioned on a second, opposing side of the control stick 200. A third support member 140 may be positioned between the first support member 141 and the second support member 142. The support members 140, 141, 142 may provide structural support to maintain the first sidewall 120 and the second sidewall 130 and a set distance from one another. The position of the support members 140, 141, 142 relative to the sidewalls 120, 130 may be fixed.

A pair of elongate members 151, 152 may extend between the first sidewall 120 and the second sidewall 130. In one embodiment, the pair of elongate members 151, 152 may be positioned at an end of the sidewalls 120, 130 opposing the ends secured to the platform 110. A first elongate member 151 may be positioned on a first side of the control stick 200 and a second elongate member 152 may be positioned on a second, opposing side of the control stick 200. The position of the elongate members 151, 152 may move relative to the sidewalls 120, 130.

The first elongate member 151 may have a planar angled surface adapted to contact a complimentary planar angled surface on the control stick 200. When the angled surface of the first elongate member 151 contacts the angled surface of the control stick 200, the first elongate member 151 may exert a force on the control stick 200 causing the control stick 200 to move forward relative to the direction of travel of the aircraft, resulting in a downward movement of the aircraft nose.

The second elongate member 152 may have a protuberance 295 adapted to contact a surface on the control stick 200. The protuberance 295 may be positioned below a bottommost surface of the second arcuate track 182 and above the top surface of the platform 110. When the protuberance 295 of the second elongate member 152 contacts the surface of the control stick 200, the second elongate member 152 may exert a force on the control stick 200 causing the control stick 200 to move backward relative to the direction of travel of the aircraft, resulting in an upward movement of the aircraft nose.

A first actuator 161 may be activated to cause the first elongate member 151 to travel along a first path 171 in a direction either toward or away from the location of the control stick 200. A second actuator 162 may be activated to cause the second elongate member 152 to travel along a second path 172 in a direction either toward or away from the location of the control stick 200.

The first path 171 may be defined by a first arcuate track 181. The first arcuate track 181 may have an aperture 183 adapted to carry a first end of the first elongate member 151. At least a portion of the first arcuate track 181 may have teeth, ridges, or the like adapted to engage a first sprocket 191 secured to the first elongate member 151. The first actuator 181 may be activated to rotate the first sprocket 191, causing the first elongate member 151 to travel along the first path 171 defined by the first arcuate track 181.

The second path 172 may be defined by a second arcuate track 182. The second arcuate track 182 may have an aperture 184 adapted to carry a first end of the second elongate member 152. At least a portion of the second arcuate track 182 may have teeth, ridges, or the like adapted to engage a second sprocket 192 secured to the second elongate member 152. The second actuator 182 may be activated to rotate the second sprocket 192, causing the second elongate member 152 to travel along the second path 172 defined by the second arcuate track 182.

The angle of curvature of the first path 171 may be different than the angle of curvature of the second path 172.

Figure 1:
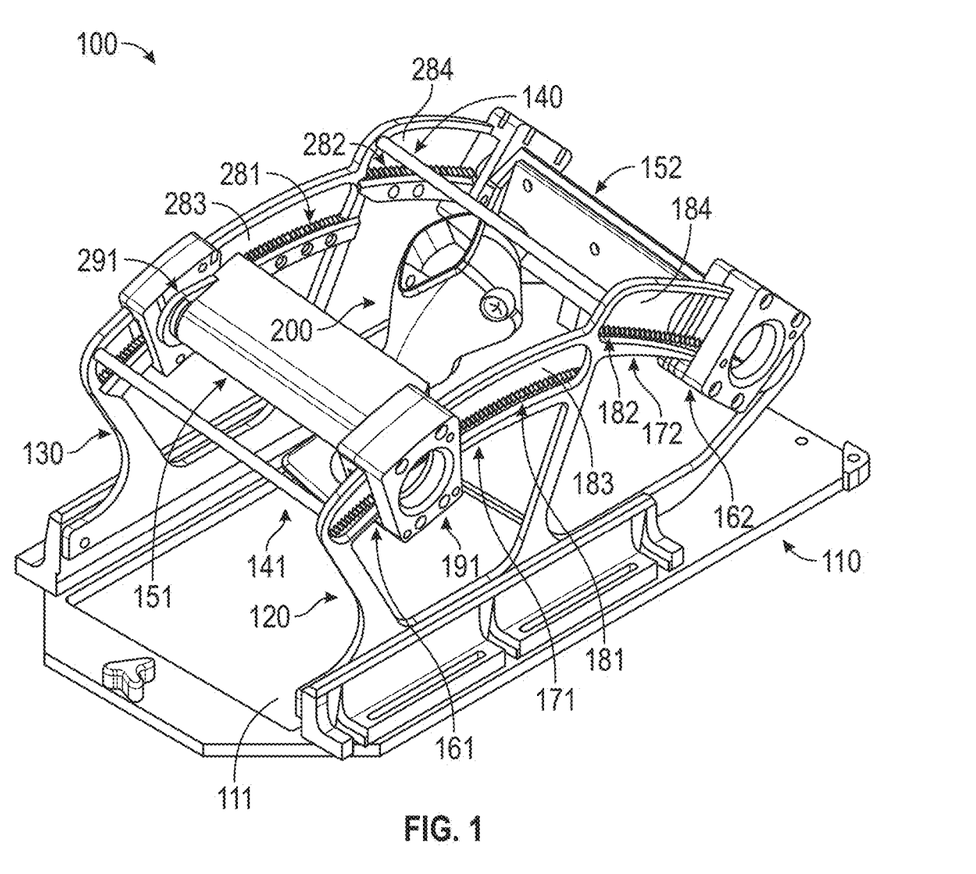
FIG. 1 is a front perspective view of a system for manipulating the control stick of an aircraft according to an embodiment of the present invention in combination with a control stick.
Figure 2:
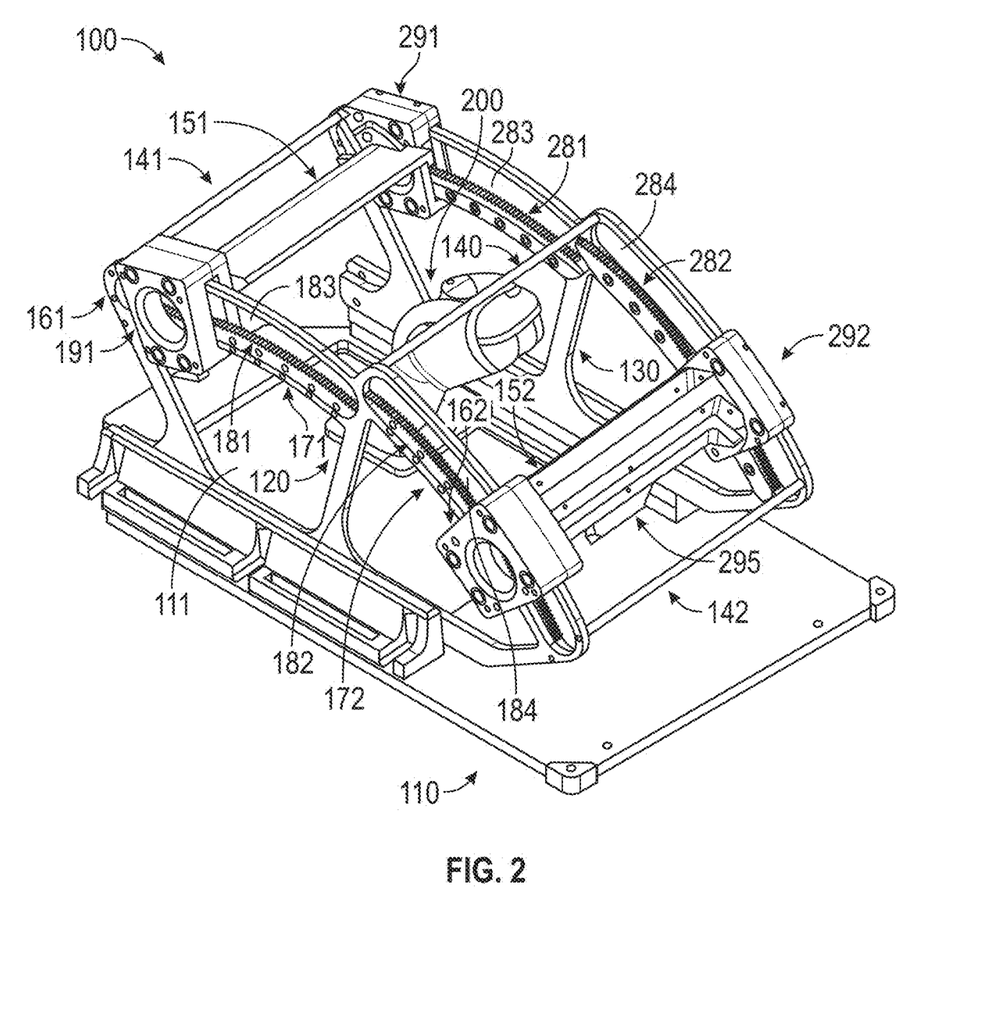
FIG. 2 is a rear perspective view of the system of FIG. 1.
Figure 3:
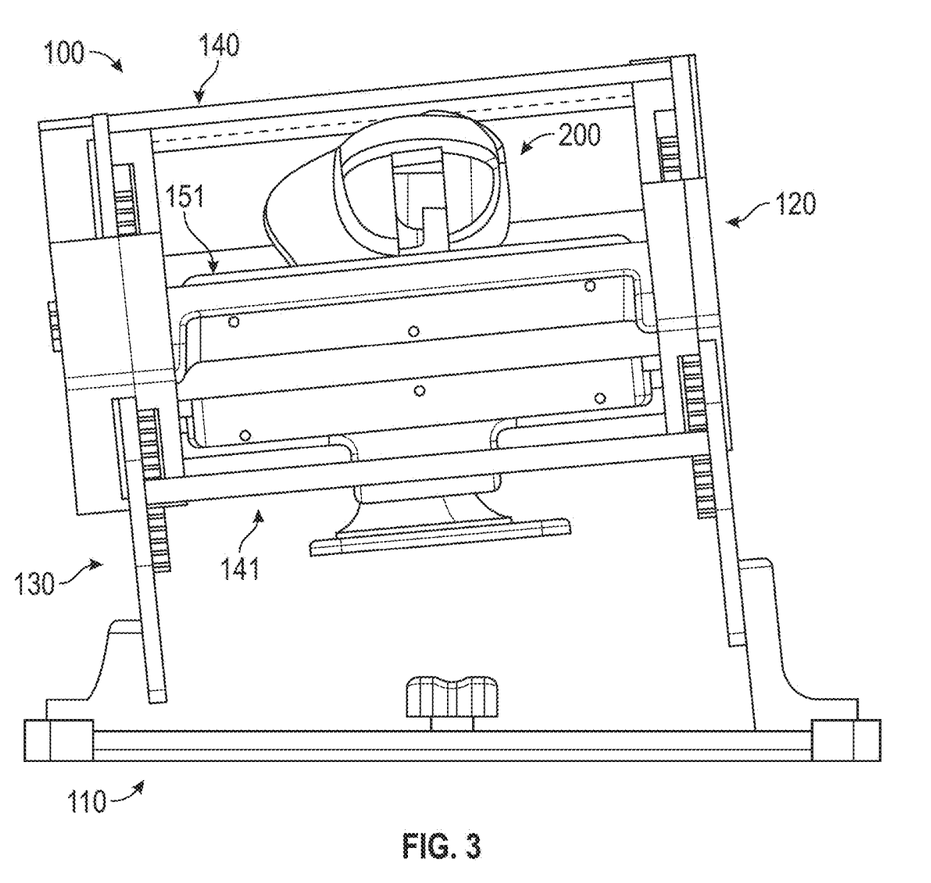
FIG. 3 is a front elevation view of the system of FIG. 1.
Figure 4:
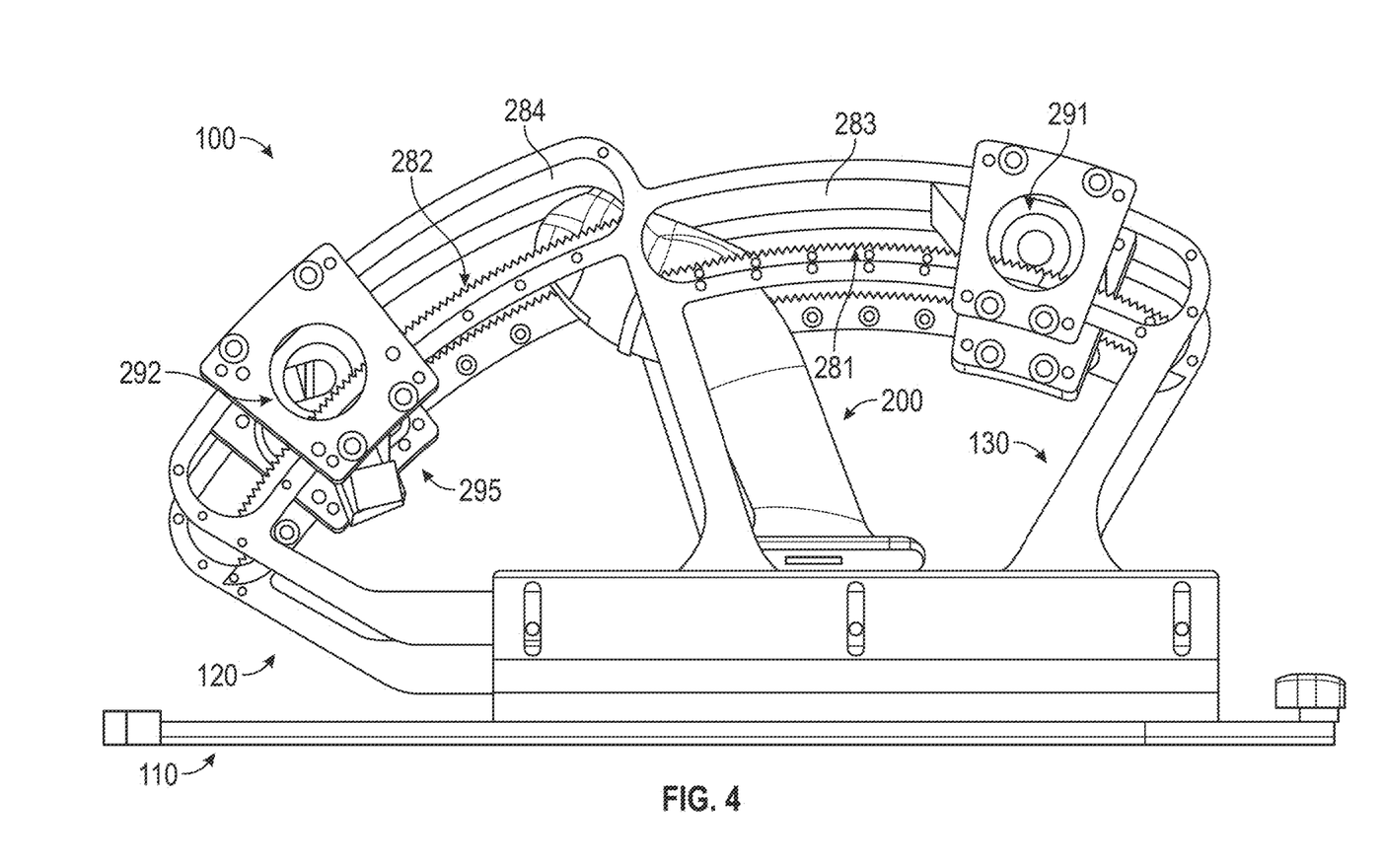
FIG. 4 is a left side elevation view of the system of FIG. 1.
Figure 5:
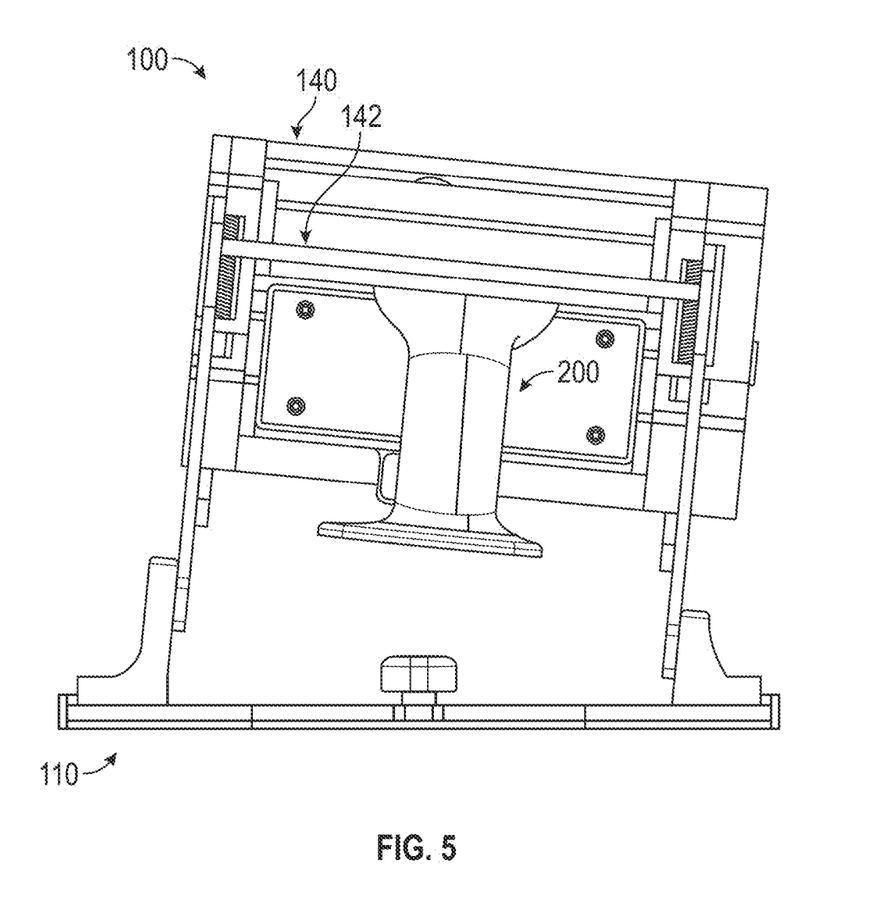
FIG. 5 is a rear elevation view of the system of FIG. 1.
Figure 6:
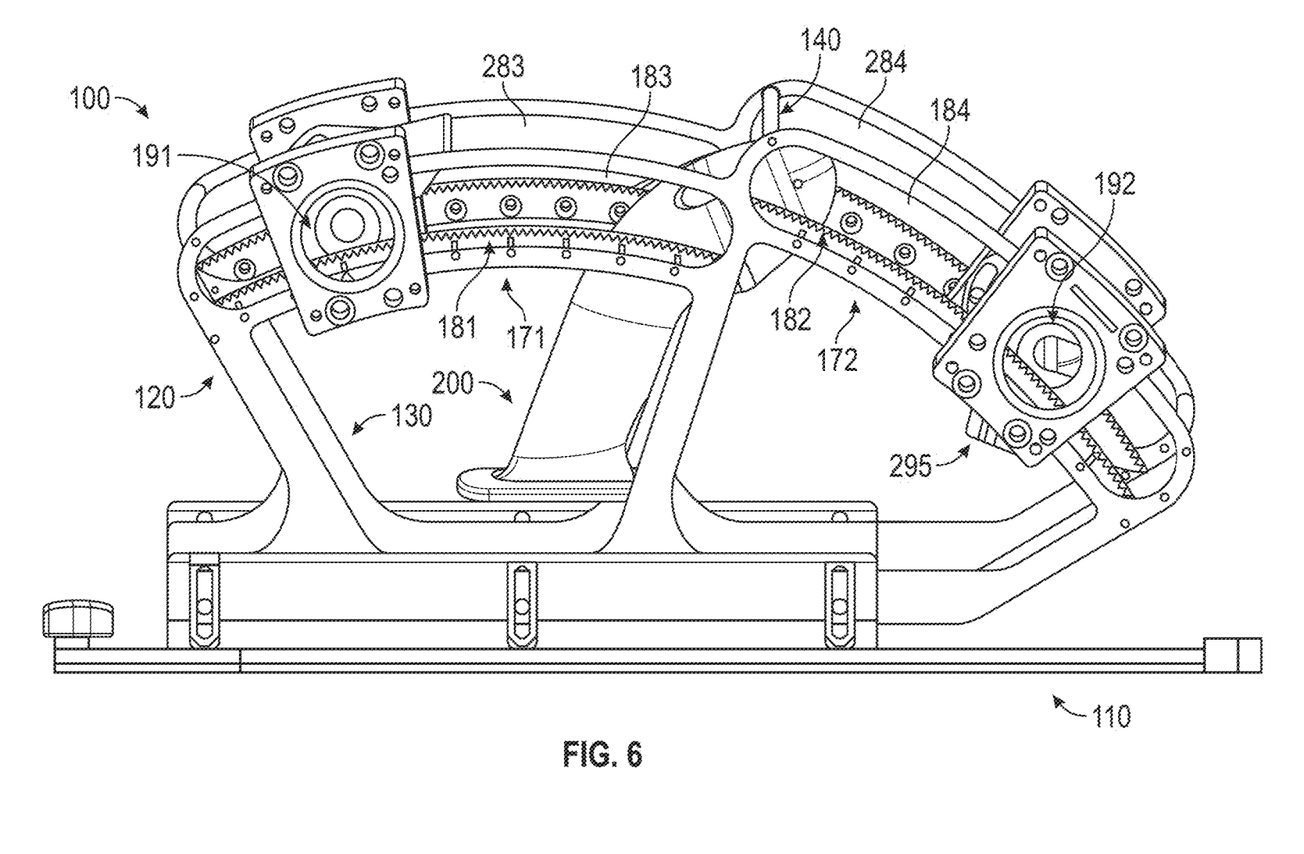
FIG. 6 is a right side elevation view of the system of FIG. 1.

A third arcuate track 281 may have an aperture 283 adapted to carry a second end of the first elongate member 151, which opposes the first end of the first elongate member 151. At least a portion of the third arcuate track 281 may have teeth, ridges, or the like adapted to engage a third sprocket 291 secured to the first elongate member 151.

A fourth arcuate track 282 may have an aperture 284 adapted to carry a second end of the second elongate member 152, which opposes the first end of the second elongate member 152. At least a portion of the fourth arcuate track 282 may have teeth, ridges, or the like adapted to engage a fourth sprocket 292 secured to the second elongate member 152.

Figure 7:
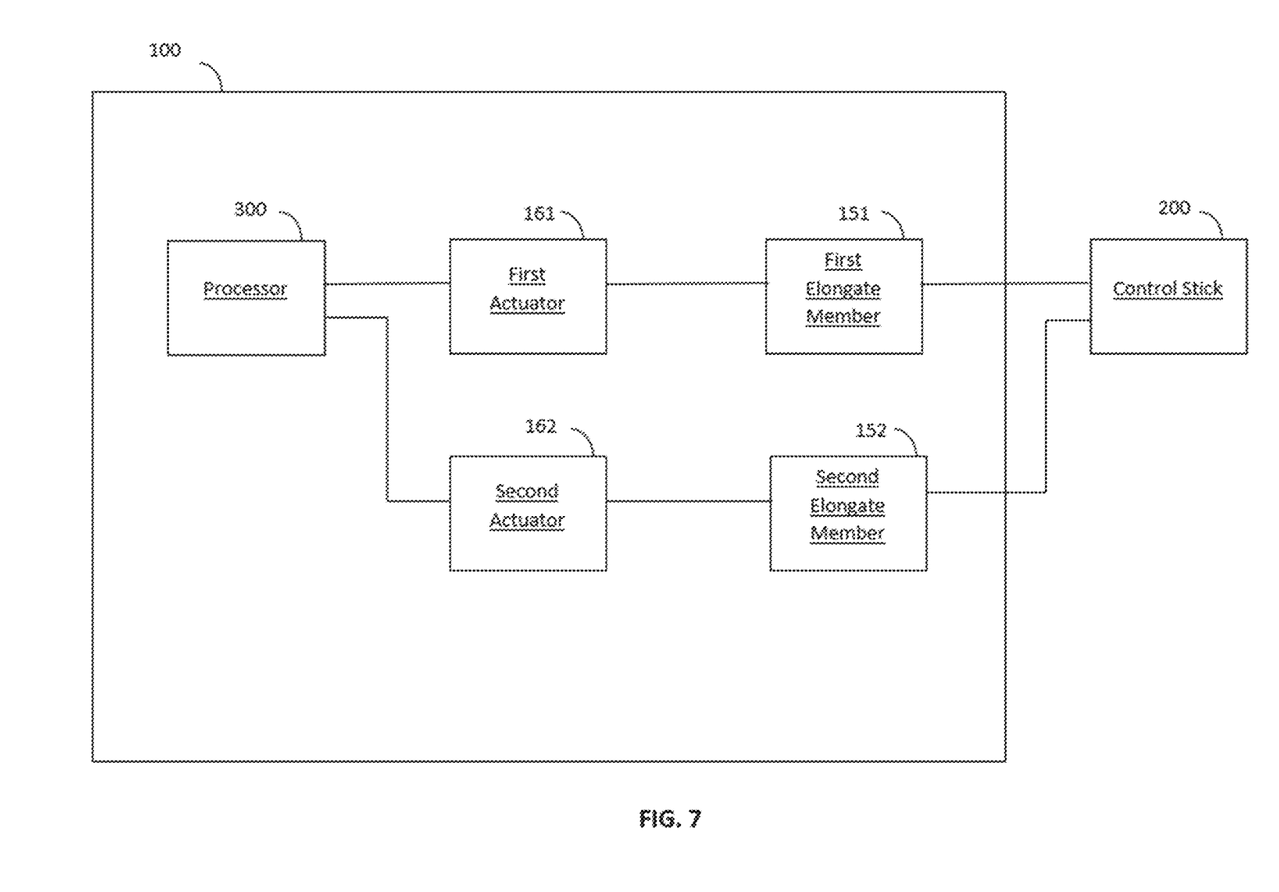
FIG. 7 is a block diagram of the system for manipulating the control stick of an aircraft according to an embodiment of the present invention.

One embodiment of the system may include a processor 300 in electrical communication with the first actuator 161 and second actuator 162. The processor 300 may be adapted to activate and deactivate the first actuator 161 and second actuator 162 to move each of the first elongate member 151 and second elongate member 152 into desired positions causing the control stick 200 to move in a manner that causes the aircraft to execute a maneuver. The actuators 161, 162 may be activated to cause the control stick 200 to move and cause the aircraft to perform a preprogrammed maneuver.

At least a portion of the system 100 may pivot relative to the platform 110 of the system 100. In one embodiment, the sidewalls 120,130 and the elongate members 151, 152 may remain in the same orientation relative to each other and pivot relative to the platform 110. In one embodiment, the sidewalls 120,130, the elongate members 151, 152, and the support members 140, 141, 14 may remain in the same orientation relative to each other and pivot relative to the platform 110.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

What is claimed is:

1. A system for manipulating the control stick of an aircraft comprising:
   a platform having an aperture, wherein the control stick is positioned within an area defined by the aperture;
   a first sidewall secured to and extending perpendicular to the platform;
   a second sidewall, opposing the first sidewall, secured to and extending perpendicular to the platform;
   a first elongate member extending between the first sidewall and the second sidewall, positioned on a first side of the control stick;
   a second elongate member extending between the first sidewall and the second sidewall, positioned on a second side of the control stick, wherein the first side of the control stick opposes the second side of the control stick;
   a first actuator configured to move the first elongate member along a first path; and
   a second actuator configured to move the second elongate member along a second path.

2. The system of claim 1 further comprising:
   a first arcuate track defining the first path traveled by the first elongate member.

3. The system of claim 2 further comprising a sprocket wherein the first arcuate track comprises an aperture wherein at least a portion of a perimeter of the aperture is adapted to engage the sprocket.

4. The system of claim 2 further comprising:
   a third arcuate track opposing the first arcuate track wherein a first end of the first elongate member is carried by the first arcuate track and a second end of the first elongate member is carried by the third arcuate track.

5. The system of claim 2 further comprising:
   a second arcuate track defining the second path traveled by the second elongate member.

6. The system of claim 5 further comprising:
   a third arcuate track opposing the first arcuate track wherein a first end of the first elongate member is carried by the first arcuate track and a second end of the first elongate member is carried by the third arcuate track; and
   a fourth arcuate track opposing the second arcuate track wherein a first end of the second elongate member is carried by the second arcuate track and a second end of the second elongate member is carried by the fourth arcuate track.

7. The system of claim 5 further comprising a first support member having a first end secured to the first arcuate track and a second end secured to the second arcuate track.

8. The system of claim 7 wherein the control stick is positionable between the first support member and the platform.

9. The system of claim 5 wherein the second elongate member comprises a protuberance positioned between a bottommost surface of the second arcuate track and above the platform, wherein the protuberance is adapted to contact a surface of the control stick.

10. The system of claim 1 further comprising a processor adapted to control the first actuator to position the control stick and cause the aircraft to execute a preprogrammed maneuver.

11. The system of claim 1 wherein the platform is adapted to secure to a console of the aircraft.

12. The system of claim 1 wherein the first elongate member comprises an angled surface adapted to contact an angled surface of the control stick.

13. The system of claim 1 wherein the first sidewall, second sidewall, first elongate member, and second elongate member are adapted to pivot relative to the platform.

14. A system for manipulating the control stick of an aircraft comprising:
   a platform having an aperture, wherein the control stick is positioned within an area defined by the aperture;
   a first sidewall secured to and extending perpendicular to the platform;
   a second sidewall, opposing the first sidewall, secured to and extending perpendicular to the platform;
   a first elongate member extending between the first sidewall and the second sidewall, positioned on a first side of the control stick;
   a second elongate member extending between the first sidewall and the second sidewall, positioned on a second side of the control stick, wherein the first side of the control stick opposes the second side of the control stick;
   a first actuator configured to move the first elongate member along a first path;
   a second actuator configured to move the second elongate member along a second path;
   a first arcuate track defining the first path traveled by the first elongate member; and
   a third arcuate track opposing the first arcuate track wherein a first end of the first elongate member is proximate the first arcuate track and a second end of the first elongate member is proximate the third arcuate track.

15. The system of claim 14 further comprising a sprocket wherein the first arcuate track comprises an aperture wherein at least a portion of a perimeter of the aperture is adapted to engage the sprocket.

16. The system of claim 14 further comprising:
   a second arcuate track defining the second path traveled by the second elongate member; and
   a fourth arcuate track opposing the second arcuate track wherein a first end of the second elongate member is proximate the second arcuate track and a second end of the second elongate member is proximate the fourth arcuate track.

17. The system of claim 14 further comprising a first support member having a first end secured to the first arcuate track and a second end secured to the second arcuate track.

18. The system of claim 17 wherein the control stick is positionable between the first support member and the platform.

19. The system of claim 14 wherein the first sidewall, second sidewall, first elongate member, second elongate member, first arcuate track, and second arcuate track are adapted to pivot relative to the platform.

20. A system for manipulating the control stick of an aircraft comprising:
   a platform having an aperture, wherein the control stick is positioned within an area defined by the aperture;
   a first sidewall secured to and extending perpendicular to the platform;
   a second sidewall, opposing the first sidewall, secured to and extending perpendicular to the platform;
   a first elongate member extending between the first sidewall and the second sidewall, positioned on a first side of the control stick;
   a second elongate member extending between the first sidewall and the second sidewall, positioned on a second side of the control stick, wherein the first side of the control stick opposes the second side of the control stick;
   a first actuator configured to move the first elongate member along a first path;
   a second actuator configured to move the second elongate member along a second path;
   a first arcuate track defining the first path traveled by the first elongate member;
   a third arcuate track opposing the first arcuate track wherein a first end of the first elongate member is proximate the first arcuate track and a second end of the first elongate member is proximate the third arcuate track;
   a sprocket wherein the first arcuate track comprises an aperture wherein at least a portion of a perimeter of the aperture is adapted to engage the sprocket;
   a second arcuate track defining the second path traveled by the second elongate member;
   a fourth arcuate track opposing the second arcuate track wherein a first end of the second elongate member is proximate the second arcuate track and a second end of the second elongate member is proximate the fourth arcuate track;
   a first support member having a first end secured to the first arcuate track and a second end secured to the third arcuate track; and
   a processor adapted to control the first actuator to position the control stick and cause the aircraft to execute a preprogrammed maneuver; and
   wherein the control stick is positionable between the first support member and the platform;
   wherein the platform is adapted to secure to a console of the aircraft;
   wherein the first elongate member comprises an angled surface adapted to contact an angled surface of the control stick;
   wherein the second elongate member comprises a protuberance positioned between a bottommost surface of the second arcuate track and above the platform;
   wherein the protuberance is adapted to contact a surface of the control stick; and
   wherein the first sidewall, second sidewall, first elongate member, second elongate member, first arcuate track, second arcuate track, third arcuate track, fourth arcuate track, and first support member are adapted to pivot relative to the platform.

* * * * *